United States Patent Office 2,945,118
Patented July 12, 1960

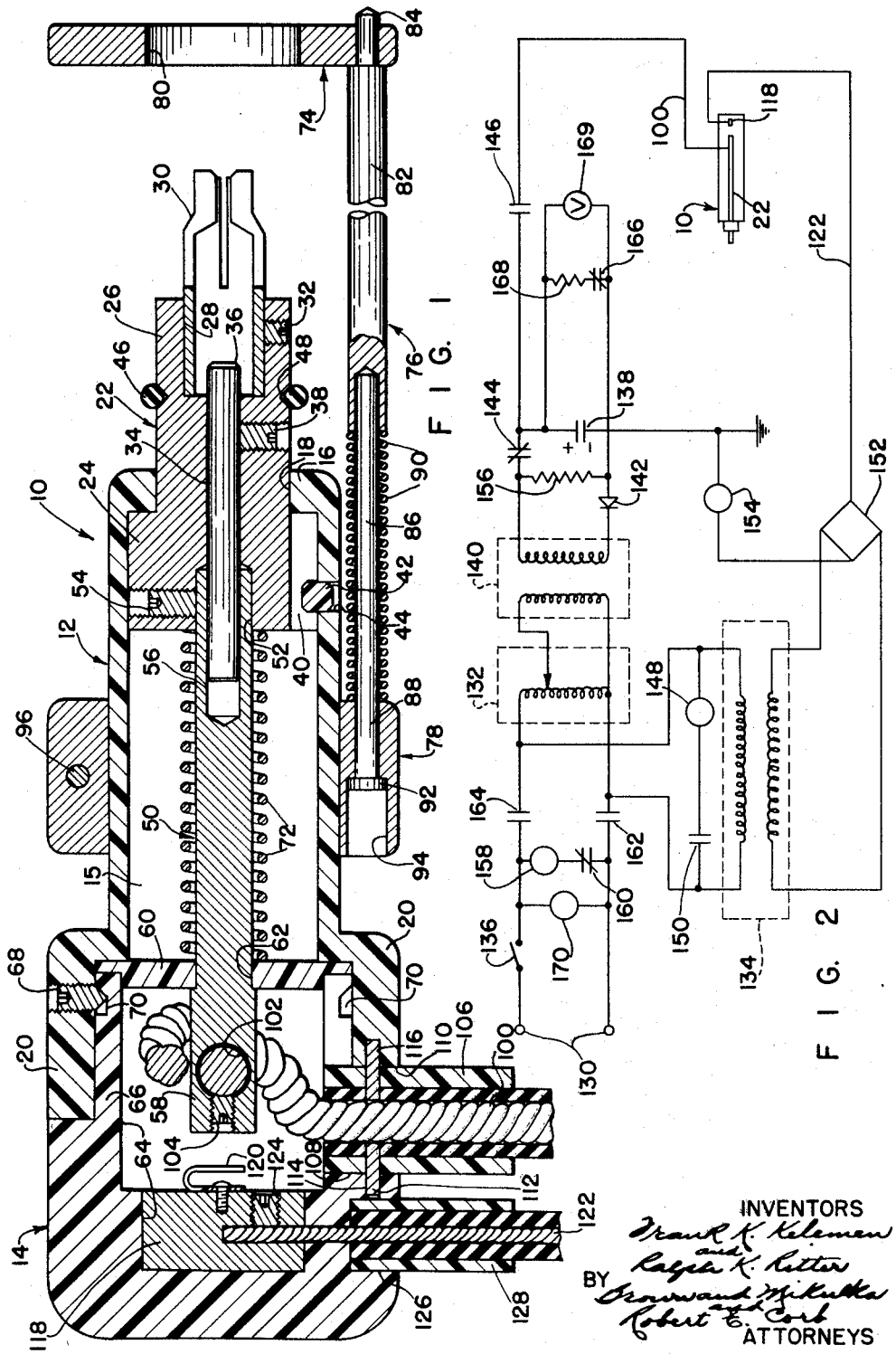

2,945,118

STUD WELDING APPARATUS

Frank K. Kelemen and Ralph K. Ritter, Haddonfield, N.J., assignors to KSM Products, Inc., Merchantville, N.J., a corporation of New Jersey Filed Aug. 22, 1958, Ser. No. 756,655

12 Claims. (Cl. 219—98)

This invention relates to electric arc welding apparatus and, more particularly, to manually operable stud welding apparatus.

In one method of arc welding the end of a metallic stud to another metallic body or workpiece, such as a plate or sheet, a stud is employed having a small projection at its end to be welded. The stud is positioned for welding with the projection located in contact with the workpiece and is biased toward the workpiece by a predetermined force. Welding of the stud is accomplished by passing current through the stud and workpiece, preferably by the discharge of a capacitor. The current causes the projection, which is relatively small, to disintegrate almost instantly, allowing the stud to move toward the body member, and produces an arc between the end of the stud and the body member during movement of the former into contact with the latter. The apparatus for performing this method of welding generally comprises a hand-operated welding gun and means for supplying welding current to the gun. The gun functions to hold the stud, position the stud relative to the workpiece and in contact therewith, bias the stud toward the workpiece with a predetermined force, trigger the discharge of a capacitor and conduct the current therefrom through the stud and workpiece.

An object of the invention is to provide a novel stud welding gun comprising only three basic elements, including a housing, a movable spindle within the housing, and a foot, for positioning the gun with respect to a workpiece.

Another object of the invention is to provide a stud welding gun of the type described adapted to function so that the operator thereof is required only to secure a stud in the gun and press the gun against the workpiece for triggering the discharge of a capacitor and effecting the welding of the stud to the workpiece.

A further object of the invention is to provide a stud welding gun of the type described characterized by its simplicity and inexpensiveness of construction, the facility with which it can be assembled, and its ease and dependability of operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

Figure 1 is a sectional view of one form of stud welding gun embodying the present invention, the section being taken substantially along the main longitudinal axis of said gun; and Fig. 2 is a wiring diagram illustrating schematically one form of electrical circuit for use with the gun of Fig. 1.

The novel stud welding gun of the present invention is illustrated, by way of example, as embodied in a substantially automatic gun which, when loaded with a stud, is pressed against the workpiece to effect the welding of the stud to the workpiece. In the preferred form shown, the gun comprises a housing, a spindle mounted for slidable movement in the housing and including stud-holding means, and a foot which is placed in contact with the workpiece for predeterminedly positioning the stud and gun with respect to the workpiece.

The gun housing comprises a first or forward housing section 12 and a second or rear housing section 14, both formed of an electrically nonconducting material such as a plastic, for example of the thermosetting phenolic type. First housing section 12 is in the form of a cylinder or barrel having a main longitudinal bore 15 of substantially uniform diameter, an inwardly extending section 16 at its forward end providing an opening 18 of smaller diameter than that of main bore 15 and an enlarged section 20 at its other or rear end providing a cylindrical bore of greater diameter than the main longitudinal bore. Mounted for sliding movement within bore 15 is a spindle assembly comprising a spindle 22 having an enlarged section 24 slidably engaged in bore 15 and a second or forward section 26 of lesser diameter for projecting through opening 18. Second section 26 is provided with a recess 28 in its forward end for a stud-holding means, such as a chuck 30, for engaging and operatively mounting a stud for welding. Chuck 30 is releasably retained in recess 28 by a setscrew 32 threaded radially into the spindle.

Spindle 22 is provided with a longitudinal bore 34 opening into chuck 30 for slidably mounting a pin 36 adapted to act as a stop for the end of a stud inserted into chuck 30 for positioning the stud within the chuck and determining the length of the stud which is allowed to project from the chuck. A setscrew 38 threaded into spindle 22 is provided for releasably retaining pin 36 in a fixed position within bore 34. Rotation of spindle 22 within bore 15 is prevented by the provision of a longitudinal keyway 40 in enlarged section 24 of the spindle and a key 42 secured in an opening 44 in first housing section 12 in the region of its forward end and inwardly extending section 16, and projecting into main bore 15 into keyway 40. As a means for preventing molten metal or other materials which may splatter during the welding operation from entering opening 18 between inwardly extending section 16 and spindle 22, there is provided an O-ring 46 seated in a peripheral V-groove 48 in spindle 22. O-ring 46 may be formed of a flexible elastic material, such as hard rubber, so that it can be stretched over the spindle for the purpose of assembly or replacement.

The spindle assembly includes an elongated spindle rod 50 secured at its forward end in an axial recess 52 in the rear of enlarged section 24 of spindle 22 by a setscrew 54 threaded into the enlarged section of the spindle. Rod 50 extends from the spindle 22 in the forward portion of forward housing section 12, rearward into enlarged section 20 of the housing. The forward end of spindle rod 50 is provided with an axial bore 56 to accommodate pin 36, and the opposite or rear end of the rod is provided with an enlarged section 58 of greater diameter than the major portion of the rod. A retaining washer 60 is provided, seated in enlarged section 20 of the first housing section in closing relation to the rear end of bore 15. Washer 60 includes a central hole or opening 62 adapted to slidably engage the smaller-diameter portion of spindle rod 50. Opening 62 is of a diameter insufficient to allow the passage of enlarged section 58 of the spindle rod, thereby retaining washer 60, the spindle rod assembly and spring 72 together as a unit when rear housing section 14 is removed. While retaining washer 60 may be formed of metal, it is preferably formed of an electrically nonconducting material, as are the two housing sections, so as to provide an electrically nonconducting mounting for the spindle assembly.

Second housing section 14 is generally cylindrical and cup-shaped, having a central recess or bore, generally designated at 64, and including a forward portion and a rear portion of smaller diameter. The second housing section has an outer diameter approximately equal to the outer diameter of enlarged section 20 of the first housing section, and is provided with a forwardly extending skirt 66 of smaller outside diameter which extends into enlarged section 20 and abuts against retaining washer 60 for holding the latter in place. Second housing section 14 is retained in place in its assembled position by one or more setscrews 68 threaded radially into enlarged section 20 and engaged in a peripheral groove 70 in skirt 66.

As previously noted, the type of stud intended to be welded by the present gun includes a small projection on its forward end. Welding of the stud is accomplished by biasing the stud toward the workpiece with the projection in contact with the workpiece and then passing a heavy current through the stud and workpiece which causes the projection to disintegrate almost instantly. Disintegration of the projection allows the stud to move toward the workpiece, and it is during this movement that the welding arc occurs between the forward end of the stud and the workpiece. In the form of gun shown, the means for predeterminedly biasing the stud toward the workpiece comprises a compression spring 72 coiled around spindle rod 50 and bearing, at its ends, against spindle 22 and retaining washer 60 so as to urge the spindle forward through opening 18. In the operation of the gun, the stud, held in chuck 30, is placed against the workpiece and the gun housing is pressed toward the workpiece, displacing spindle 22 rearwardly against the bias of spring 72 so that the latter functions to exert a predetermined force on the spindle and stud.

As a means for positioning the gun with respect to the workpiece while allowing movement of the housing toward the workpiece, there is provided a foot 74 mounted on a plurality of legs 76 (one is shown) secured at their rear ends in a circular bracket or ring 78 secured around first housing section 12. Foot 74 is provided with an opening 80 in line with the gun axis through which a stud in chuck 30 may extend into engagement with the workpiece. Each of legs 76, of which there are preferably three in number uniformly spaced around the gun, comprises a forward section 82 having a forward tapered end portion 84 engaged in the foot and extending therethrough so as to contact the workpiece. Engaged in the rear end of forward leg section 82 is an elongated rear leg section 86 of lesser diameter slidably mounted at its rear end in a bore 88 in bracket 78. A compression spring 90 is coiled around rear leg section 86 with the ends of the spring bearing against bracket 78 and forward leg section 82 for urging the foot forward. Forward movement of the foot and legs with respect to the housing is limited by a head or enlarged section 92 on the rear end of rear leg section 86 slidably engaged in a counterbore 94 in bracket 78. Foot 74 and the pointed ends 84 of legs 76 not only function to position the gun with respect to the workpiece, but perform the added function, when the gun is employed for welding studs to thin sheet metal, of tensioning the metal in the welding area, thereby helping to insure perpendicularity of the stud with respect to the workpiece. The position of the gun with respect to the foot and workpiece is adjustable to accommodate various lengths of studs by changing the location of bracket 78 on first housing section 12. Bracket 78, for this purpose, may be in the form, for example, of a split ring, and may include a clamping screw 96 for tightening the ring around the first housing section.

Welding current is supplied to the spindle assembly and a stud engaged in chuck 30 by a cable 100 secured at its end in an opening 102 in enlarged section 58 of spindle rod 50 and retained in opening 102 by a setscrew 104 threaded axially into the spindle rod. Cable 100 is led into bore 64 in second housing section 14 through a sleeve 106 engaged in an opening 108, in the second housing section, extending rearward from the forward edge of skirt 66 so as to permit the separation of the two housing sections without requiring that cable 100 be disconnected from spindle rod 50. An opening 110 is provided in the rear portion of enlarged section 20 in alignment with a portion of opening 108 for accommodating cable 100 and sleeve 106. Sufficient slack is allowed in the portion of cable 100 within the housing between the point on the cable where it enters the housing and its point of attachment to spindle rod 50 to allow free movement of the spindle rod. As a means for retaining cable 100 in place at its point of entry into the second housing section and thereby prevent the cable from being pulled from the housing and to provide for a loop in the portion of the cable within recess 64, there is provided a retaining pin 112 extending through cable 100 and sleeve 106. Pin 112 is engaged at its ends in a recess 114 in the wall of second housing section 14, communicating with opening 108 therein, and a recess 116 in the wall of enlarged section 20 (of first housing section 12) and communicating with opening 110 therein.

As previously noted, the gun is operated by pressing it toward the workpiece for displacing the spindle assembly rearwardly against the bias of spring 72. The flow of welding current through the spindle assembly, preferably from a capacitor, is triggered automatically by a control circuit actuated when the spindle rod moves rearwardly, closing a contact and completing a triggering circuit through the spindle assembly, stud and workpiece. The control or triggering circuit includes a contact block 118 secured in the rear portion of recess 64 in second housing section 14. Contact block 118 is formed of an electrically conducting material and, in the form shown, has mounted on its forward surface a U-shaped contact spring 120. In another embodiment of the contact block and spring, the latter may be bent at an obtuse angle and secured to the side of the block, instead of the forward face, so as to extend forwardly and then across the front of the block. A control cable 122 is provided secured at its end in contact block 118 by a setscrew 124 and extends through a counterbored hole 126 in second housing section 14 where the cable is surrounded by a sleeve 128 similar to sleeve 106 for preventing flexure and possible breakage of the cable where it enters the gun housing.

By virtue of this arrangement, as spindle rod 50 is displaced rearwardly, it comes into contact with contact spring 120 completing a triggering circuit through the spindle assembly, stud and workpiece. As a result, a capacitor may be discharged, sending welding current through the spindle assembly by way of cable 100 and, as the projection on the forward end of the stud mounted on the spindle assembly is disintegrated, the stud and spindle assembly move forward under the bias of spring 72. As the spindle rod is displaced rearwardly, it deforms U-shaped contact spring 120 rearwardly so that, as the spindle rod moves forward during the welding operation, i.e., following disintegration of the projection on the stud, the contact spring remains in contact with the spindle rod during forward movement of the stud and spindle assembly, insuring that the triggering circuit will remain closed and continue the flow of welding current for the predetermined period of the welding operation.

Means for supplying welding current through cable 100 to the gun and for controlling the welding cycle by way of cable 122 connected to the gun is shown diagrammatically in Figure 2. The control and current supply means in the form shown comprise an alternating current source 130 connected across the primaries of a variable autotransformer 132 for supplying charging current for a capacitor, and a second transformer 134 for supplying current for operating the control circuit. The alternating current source, it will be noted, supplies current for both charging the capacitor employed to provide the welding current, as well as power for operating the circuit which controls the welding cycle. A switch or circuit breaker 136 is provided between the alternating current source and transformers 132 and 134 for opening the circuit from the source and rendering the control and welding current supply means inoperative.

The welding current supply circuit comprises a condenser 138 connected in series with the secondary of an isolation transformer 140, rectifier 142 and normally closed contact points 144. Isolation transformer 140 supplies current through rectifier 142 for charging condenser 138 and, in turn, is connected with auto transformer 132. One side of condenser 138 is grounded and the other side is coupled through normally open contact points 146 and cable 100 to the spindle of the welding gun 10. When switch 136 is closed, condenser 138 is charged by current from transformer 140 flowing through the circuit comprising contact points 144 and rectifier 142. Discharge of condenser 138 and supply of welding current therefrom to the gun is accomplished by closing contact points 146.

The circuit for controlling the operation of the welding current supply means and gun comprises a contactor coil 148 connected through normally open contact points 150 to alternating current source 130. Coil 148 controls the operation of contact points 144 and 146 and is adapted, when energized, to open contact points 144 and close points 146. Transformer 134 supplies current for rectifier 152. One side of rectifier 152 is connected to the ground through a direct current relay 154 and the other side of rectifier 152 is coupled with contact block 118 of gun 10. Direct current relay 154 controls the operation of contact points 150 and, when energized, is adapted to close points 150.

In the operation of the welding gun, control circuit and welding current supply circuit, the gun is pressed toward a grounded workpiece until spindle 22 touches contact spring 120 completing the circuit through rectifier 152, energizing direct current relay 154, and closing contact points 150. Main contactor coil 148 is energized, opening contact points 144 and closing contact points 146, thereby allowing condenser 138 to discharge through the gun, spindle, stud and workpiece. When the gun is disengaged from the welded stud following a welding operation, a circuit through direct current relay 154 is opened allowing contact points 150 to open, deenergizing main contactor coil 148, opening contact points 146, and closing contact points 144, the latter allowing condenser 138 to commence charging.

The charge on the condenser, and hence the welding current, is controlled by adjustable auto transformer 132, which allows for varying the charging potential across the secondary of transformer 140. Should the output potentials of the auto transformer 132 and transformer 140 be reduced after condenser 138 has been charged to a higher value, it then becomes desirable to partially discharge the condenser so that the charge thereon equals the reduced potential of the secondary of transformer 140. For this purpose, there is provided a resistor 156 connected in parallel with the secondary of transformer 140 and condenser 138 between the condenser and rectifier 142. Reduction of the output potential of transformer 140 allows current from the condenser to flow through resistor 156 until the potential of the condenser and transformer 140 are equal.

The control and welding current supply circuits are provided as an assembly enclosed within a protective housing including safety featuers comprising means for deenergizing the circuits and discharging the condenser in the event the housing is opened or removed. This means, in the form shown, comprises a control relay 158 connected to the alternating current source in series with a safety switch 160, the latter being mounted in the housing in such a manner as to be opened when the housing is removed or opened. Control relay 158 has three pairs of contact points, including normally open points 162 and 164 and normally closed points 166. Contact points 162 are connected between an alternating current source 130 and one side of the primary of auto transformer 132, isolation transformer 140 and one side of the control circuit including one side of contact points 150 and the primary of transformer 134. Contact points 164 are similarly connected to the other side of the primary of auto transformer 132 and the control circuit including main contactor coil 148 and the primary of the transformer 134. By virtue of this arrangement, power to both the welding current supply circuit and the control circuit is interrupted when safety switch 160 is opened, control relay 158 is deenergized and contact points 162 and 164 open. As a means for effecting the discharge of condenser 138 when either switch 136 or switch 160 is opened, contact points 166 are provided connected in series with a resistor 168 across capacitor 138, providing a circuit through which the condenser may discharge when relay 158 is deenergized and points 166 closed. The circuit also includes a voltmeter 169 for determining the charge on condenser 138 and a pilot light 170 for indicating when switch 136 is closed and the welder is in operation.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Stud welding apparatus comprising, in combination, a housing formed of an electrically nonconducting material and having a bore open at its forward end and closed at its rear end, a spindle mounted for movement forwardly and rearwardly within said bore, said spindle projecting from the forward end of said bore, being formed of an electrically conductive material, and having a stud-holding means mounted on its forward end, resilient means within the forward portion of said bore for biasing said spindle forwardly within said bore, an electrical conductor for supplying welding current to said spindle, said conductor being led into the rear portion of said bore, being connected at its end within said rear portion of said bore to said rear portion of said spindle and being secured to said housing at its point of entry into said housing, the portion of said conductor between its point of entry and its point of attachment to said spindle being located within said rear portion of said bore, a contact member fixedly mounted within said bore at the rear of said bore in the path of rearward movement of said spindle for making contact with said spindle and completing an electrical circuit through said spindle, and an electrical conductor connected to said contact member and extending from said housing.

2. Stud welding apparatus comprising, in combination, a housing formed of an electrically nonconducting material and having a bore open at its forward end and closed at its rear end, a spindle mounted for movement forwardly and rearwardly within said bore, said spindle projecting from the forward end of said bore, being formed of an electrically conductive material and having a stud-holding means mounted on its forward end, the diameter of at least the rear portion of said spindle being substantially less than the diameter of the rear portion of said bore, an electrical conductor for supplying welding current to said spindle, said conductor being led into the rear portion of said bore and being connected at its end within said bore to said rear portion of said spindle, said conductor being secured to said housing at the point of entry of said conductor into said housing and being provided with a slack loop in the portion of said conductor within said housing between its point of entry into said housing and its point of attachment to said spindle, a contact member fixedly mounted within said bore at the rear of said bore in the path of rearward movement of said spindle for making contact with said spindle and completing an electrical circuit through said spindle, and an electrical conductor connected to said contact member and extending from said housing.

3. The stud welding apparatus of claim 2 wherein said contact member comprises a spring compressible toward the rear of said housing by engagement with said spindle.

4. Stud welding apparatus comprising, combination, a housing comprising a forward section having an elongated axial bore open at both ends and a rear housing section secured in closing relation to said forward housing section at the rear of said bore and having a recess comprising a continuation of said bore, a spindle formed of an electrically conducting material mounted for limited movement forwardly and rearwardly within said bore, said spindle including a forward portion projecting from the forward end of said bore, an intermediate portion engaged for sliding movement in said bore, and a rear portion having a diameter substantially smaller than said bore and recess and disposed within said recess, stud-holding means mounted on said forward portion of said spindle exterior of said housing, an electrical conductor for supplying welding current to said spindle, said conductor being led into said recess, being connected at its end within said recess to said rear portion of said spindle and being secured to said rear housing section at its point of entry into said recess, the portion of said conductor between its point of entry and its point of attachment to said spindle being located within said recess, a contact member mounted within the rear of said recess in the path of rearward movement of said spindle for contacting said spindle and completing a circuit through said spindle, and an electrical conductor connected to said contact member and extending from said rear housing section.

5. The stud welding apparatus of claim 4 wherein a dividing element is provided in said bore across the forward portion of said recess, said dividing element having an opening for slidably engaging said intermediate portion of said spindle, and said flexible conductor being connected to said spindle within said recess at the rear of said dividing element.

6. The stud welding apparatus of claim 5 wherein the opening in the forward end of said bore has a diameter substantially less than the diameter of said bore, said spindle includes an enlarged section engaged in said bore and of a greater diameter than said opening, and said resilient means comprises a spring coiled around said intermediate portion of said spindle and bearing at its ends against said enlarged section of said spindle and said dividing element for urging said spindle forwardly within said bore.

7. Stud welding apparatus comprising, in combination, a housing, including a forward section having an opening in its forward end and an axial bore, said bore including a forward portion of greater diameter than said opening and a rear portion of greater diameter than said forward portion, and a generally cup-shaped rear housing section engaged in closing relation to said bore within said rear portion of said bore and having a recess providing a continuation of said forward portion of said bore, both of said housing sections being formed of electrically nonconducting material, an electrically conductive spindle mounted within said bore for movement forwardly and rearwardly therein, resilient means for urging said spindle forward in said bore, said spindle including a forward portion having a diameter larger than said opening and engaged in said bore whereby forward movement of said spindle is limited, a stud-holding means mounted on said forward portion of said spindle and projecting from said housing through said opening, contact means mounted within said recess at the rear thereof in position to contact the rear end of said spindle when the latter is displaced rearwardly against the bias of said resilient means, an electrical conductor for supplying welding current to said spindle, said conductor extending into said recess and being secured to said rear housing section at its point of entry into said recess, the portion of said conductor within said bore being connected at its end to the rear end portion of said spindle, and another electrical conductor connected to said contact means and extending from said recess.

8. Stud welding apparatus comprising, in combination, a housing including a forward section having an opening in its forward end and an axial bore including a forward portion of greater diameter than said opening and a rear portion of greater diameter than said forward portion, and a generally cup-shaped rear section engaged in closing relation to said bore within said rear portion of said bore and having a recess providing a continuation of said forward portion of said bore, said forward and rear housing sections being formed of electrically nonconducting material, a spindle formed of an electrically conductive material mounted for limited movement forwardly and rearwardly within said bore, said spindle including a forward portion projecting through said opening in the forward end of said housing, an intermediate portion engaged for sliding movement in said forward portion of said bore, and a rear portion having a diameter substantially smaller than said bore and recess and extending within said bore and recess, stud-holding means mounted on said forward portion of said spindle exterior of said housing, an electrical conductor for supplying welding current to said spindle, said conductor extending into said recess and being connected at its end within said recess to said rear portion of said spindle, said conductor being secured to said rear housing section at the point of entry of said conductor into said recess and being provided with a slack loop in the portion of said conductor between its point of entry and its point of attachment to said spindle, said slack loop being disposed within said recess, a contact member mounted within the rear of said recess in the path of rearward movement of said spindle for contacting said spindle and completing a circuit through said spindle, and an electrical conductor connected to said contact member and extending from said rear housing section.

9. The stud welding apparatus of claim 8 wherein a dividing element is provided in said rear portion of said bore across the forward portion of said recess, said dividing element having an opening for slidably engaging said rear portion of said spindle, and said flexible conductor being connected to said spindle within said recess at the rear of said dividing element.

10. The stud welding apparatus of claim 9 wherein said intermediate section of said spindle is of a greater diameter than said opening, and said resilient means comprises a spring coiled around said rear portion of said spindle and bearing at its ends against said enlarged intermediate portion of said spindle and said dividing element for urging said spindle forwardly within said bore.

11. The stud welding apparatus of claim 8 wherein said flexible electrical conductor is led into said recess through aligned openings in the rear portion of said forward housing section and the forward portion of said rear housing section and is secured at its point of entry into said recess by a retaining member engaged in said forward and rear housing sections in said openings therein.

12. Stud welding apparatus comprising, in combination, a housing, including a forward section having an opening in its forward end and an axial bore, including a forward portion of greater diameter than said opening and a rear portion of greater diameter than said forward portion, and a generally cup-shaped rear section engaged in closing relation to said bore within said rear portion of said bore and having a recess providing a continuation of said forward portion of said bore, said forward and rear housing sections being formed of electrically nonconducting material, a spindle formed of electrically conductive material mounted for limited movement forwardly and rearwardly within said bore, said spindle including a forward portion projecting through said opening and mounting a stud-holding means exteriorly of said bore, an enlarged intermediate portion engaged for sliding movement in said forward portion of said bore, and an elongated rear portion of lesser diameter than said intermediate portion extending rearwardly in said bore into said recess, a dividing element mounted in the rear portion of said bore across the forward portion of said recess, said dividing element having an opening for slidably engaging said rear portion of said spindle, a flexible electrical conductor for supplying welding current to said spindle, said conductor extending into said recess and being connected at its end within said recess to said rear portion of said spindle, said conductor being secured to said rear housing section at the point of entry of said conductor into said recess and being provided with a slack loop in the portion of said conductor between its point of entry and its point of attachment to said spindle, said slack loop being disposed within said recess at the rear of said dividing element, a contact member mounted within the rear of said recess in the path of rearward movement of said spindle for contacting said spindle and completing a circuit through said spindle in response to rearward movement of said spindle, and an electrical conductor connected to said contact member and extending from said rear housing section.

References Cited in the file of this patent
UNITED STATES PATENTS

| | | |
|---|---|---|
| 1,240,901 | Symons | Sept. 25, 1917 |
| 2,260,969 | Crecca et al. | Oct. 28, 1941 |
| 2,315,502 | Crecca et al. | Apr. 6, 1943 |
| 2,413,189 | Nelson | Dec. 24, 1946 |
| 2,817,001 | Woodling | Dec. 17, 1957 |